US006986482B2

(12) United States Patent
Brefort et al.

(10) Patent No.: US 6,986,482 B2
(45) Date of Patent: Jan. 17, 2006

(54) SUSPENSION PART OF A TURBOJET ENGINE

(75) Inventors: François Brefort, Bernay (FR); Lydie Chevalier, Lesigny (FR); Jean-Louis Picard, Vaux le Penil (FR); Jean-Claude Félix Pasquer, Lieusaint (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/450,701

(22) PCT Filed: Dec. 20, 2001

(86) PCT No.: PCT/FR01/04088

§ 371 (c)(1),
(2), (4) Date: Dec. 29, 2003

(87) PCT Pub. No.: WO02/49914

PCT Pub. Date: Jun. 27, 2002

(65) Prior Publication Data

US 2004/0094680 A1 May 20, 2004

(30) Foreign Application Priority Data

Dec. 21, 2000 (FR) .................................. 00 16734

(51) Int. Cl.
*B64D 27/00* (2006.01)

(52) U.S. Cl. ........................ 244/54; 248/554; 248/557; 60/797

(58) Field of Classification Search ............. 248/230.1, 248/554, 555, 556, 557; 244/54; 60/797
See application file for complete search history.

(56) References Cited

U.S. PATENT DOCUMENTS

| | | | | | |
|---|---|---|---|---|---|
| 5,078,342 | A | * | 1/1992 | Langley et al. | 244/54 |
| 5,238,206 | A | * | 8/1993 | Pachomoff | 244/54 |
| 5,351,930 | A | * | 10/1994 | Gwinn et al. | 248/557 |
| 5,871,175 | A | * | 2/1999 | Demouzon et al. | 244/54 |
| 5,871,176 | A | * | 2/1999 | Demouzon et al. | 244/54 |
| 6,173,919 | B1 | * | 1/2001 | Le Blaye | 244/54 |
| 6,189,830 | B1 | * | 2/2001 | Schnelz et al. | 244/54 |
| 6,341,746 | B1 | * | 1/2002 | Pascal et al. | 244/54 |
| 6,682,015 | B2 | * | 1/2004 | Levert et al. | 244/54 |
| 6,758,438 | B2 | * | 7/2004 | Brefort et al. | 244/54 |

FOREIGN PATENT DOCUMENTS

| | | | |
|---|---|---|---|
| EP | 527672 | * | 2/1993 |
| EP | 0 744 338 | | 11/1996 |

* cited by examiner

*Primary Examiner*—Anita M. King
(74) *Attorney, Agent, or Firm*—Oblon, Spivak, McClelland, Maier & Neustadt, P.C.

(57) ABSTRACT

A suspension part for mounting a turbojet engine includes two ends equipped with two elements, juxtaposed in a widthwise direction of the suspension part, for fixing the suspension part to the fixed structure. The ends are shaped into pairs of yokes respectively flanking connecting rods and each including fixing elements and a bearing of a journal of a connecting rod which bearing is situated underneath a fixing element. The suspension part also includes slots passing through the two ends of the suspension part and running between the yokes without running over a central portion of the suspension part. Each of the yokes has an upper portion with an additional thickness located on an inside of each of the yokes.

20 Claims, 1 Drawing Sheet

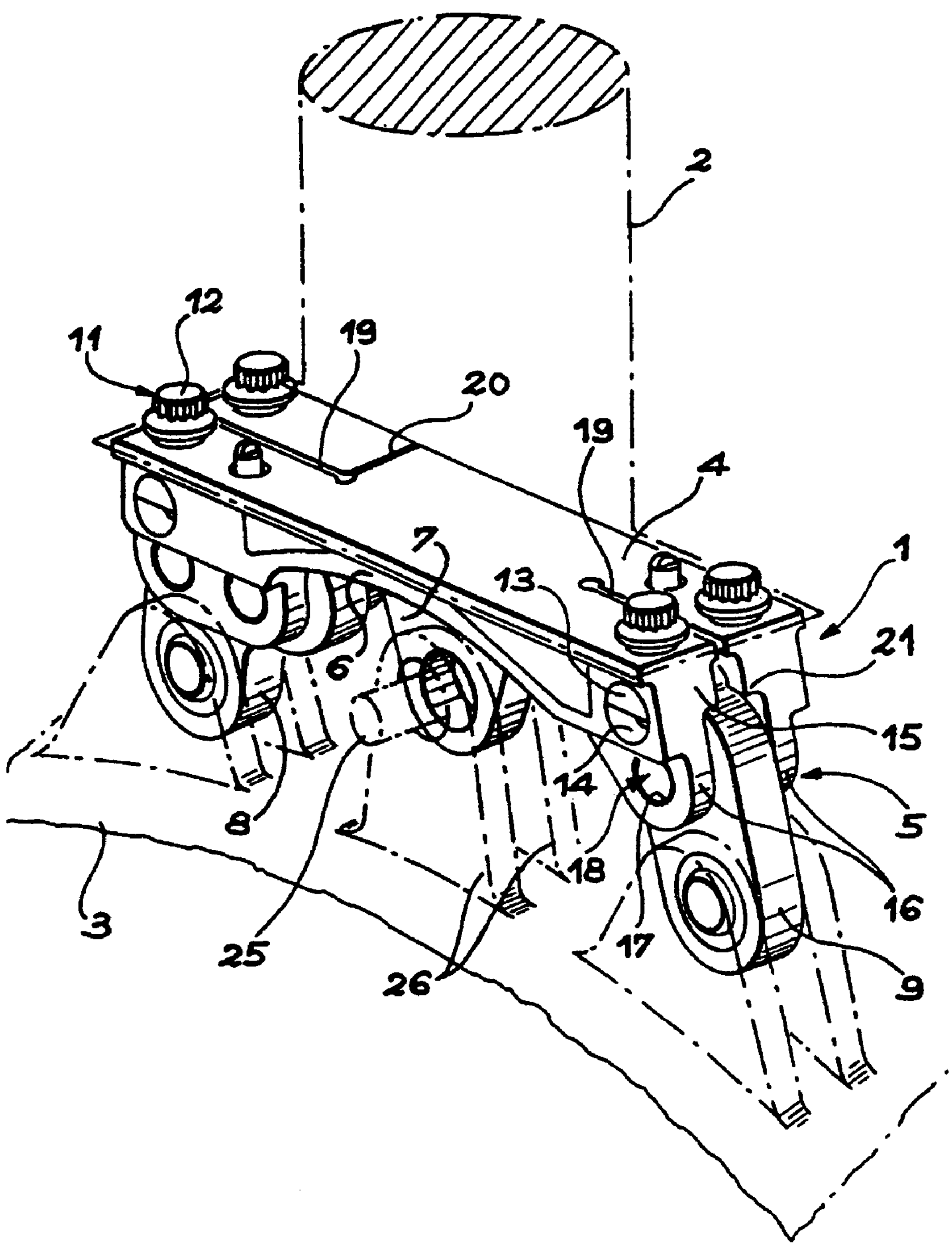
2
11
12
19
20
19
4
1
7
13
21
6
15
14
5
8
18
16
3
25
17
9
26

SUSPENSION PART OF A TURBOJET ENGINE

BACKGROUND OF THE INVENTION

1. Field of the Invention

The subject of this invention is a suspension part for mounting a turbojet engine.

2. Discussion of the Background

The subject of this invention is a suspension part for mounting a turbojet engine.

Reference will be made in particular to French patent 2 680 353 to uncover an existing example of such a suspension. It comprises an elongate part known as a fitting, or coat hook, on account of its shape, that the invention sets out to improve and that runs between a fixed strut or similar structure and the turbojet engine that is to be supported. Four fixing elements comprising screws and barrel nuts are arranged at the corners of the fitting to connect it to the fixed structure. This fitting runs transversely and carries connecting rods at its ends, which rods are articulated also to the turbojet engine; a third connecting rod runs between the center of the fitting and a portion of the turbojet engine to provide backup support should one of the end connecting rods break.

However, the fitting has itself to be protected against breakage, because the dropping-off of the turbojet engine would then be more probable than it would with the breakage of a connecting rod. It needs in particular to withstand the vertical and transverse forces and moments about the axis of the turbojet engine under varying service conditions, including when a turbojet engine blade becomes detached and significant dynamic imbalance arises. This situation produces forces that are considerable, but can be estimated fairly well in order to engineer the fitting. The phenomenon perhaps the most worthy of concern is, however, fatigue in normal service, which may give rise to cracks, the propagation of which ends up sectioning the fitting even under light load; it is not really practical to seek to guard against this cracking by strengthening the fitting as the desire is, on the contrary, to keep to a modest weight and bulk.

SUMMARY OF THE INVENTION

The concept underlying the invention is therefore to engineer the fitting in such a way that it withstands extreme static forces without reinforcements being added to prevent the onset of fatigue cracks; however, a means is provided for limiting their propagation by making sure that they never section the fitting into two comparable pieces but that they can render unserviceable just one of the four fixing elements for fixing to the strut. This then yields a situation in which the turbojet engine is supported by the remaining three elements, that is to say under normal conditions, on one side and with a single fixing element to react the forces on the corresponding connecting rod on the other side. The latter element would then be subjected to greater mechanical stresses, but ones which would remain lower than the extreme stresses designed for, and the fitting would essentially hold together.

This attitude differs completely from the one that led to the proposal described in the aforementioned patent and which consisted in splitting the fitting into two parallel elements in order to continue to provide support should one of them break. The consequence was either that the fitting was made heavier if each element had to withstand the static forces or that there was weakening as a result of the split.

To sum up, the invention relates to a suspension part for mounting a turbojet engine arranged horizontally between a fixed structure and at least two connecting rods articulated to the turbojet engine and comprising two ends equipped with two elements, juxtaposed in a widthwise direction of the part, for fixing to the fixed structure, the ends being shaped into two pairs of yokes respectively flanking the connecting rods and each comprising one of the fixing elements and a bearing of a journal of a connecting rod which bearing is situated underneath said fixing element, characterized in that slots passing through the ends of the part run between the yokes without running over a central portion of the part.

Advantageously, the yokes are thicker at the fixing elements than they are at the bearings of the journal and have an additional thickness over the connecting rods.

BRIEF DESCRIPTION OF THE DRAWING

The invention will now be described in conjunction with the single FIGURE which is a perspective view of the suspension part.

DESCRIPTION OF THE PREFERRED EMBODIMENTS

The suspension part or fitting, bearing the reference 1, runs between a strut 2 which is a fixed airplane structure and a rear section of turbojet engine, the casing 3 of which has been sketched out. It is arranged horizontally and has an elongate shape; it mainly comprises a top plate 4 and pairs of yokes 5 which lie at its ends; longitudinal ribs 6 connect the corresponding yokes 5 together and a triangular support 7 is also arranged under the plate 4. The pairs of yokes 5 carry respective connecting rods 8 and 9 for supporting the turbojet engine 3, to which they are articulated by their bottom ends. A vertical yoke or triangular support 7 is articulated to a pair of central yokes 26 of the turbojet engine 3 by a spindle 25 mounted with clearance. At each of the corners of the suspension part 1 there is a fixing element 11 allowing it to be supported by the strut 2 and which comprises a screw 12 the end of which is engaged in a barrel nut 13 (of half-moon cross section) arranged horizontally through a drilling 17 in a top portion 15 of the corresponding yoke 5; the yokes 5 also have a lower portion 16 through which there is made a drilling 17 to house a journal 18 of the connecting rod 8 or 9.

One essential feature of the invention, is a slot 19 running across each of the ends of the top plate 4 between the yokes 5 and running over a portion of the plate 4, or at least as far as the end of the yokes 5, in the main direction of elongation of the part 1. The fixing elements 11 that are adjacent and juxtaposed in the lengthwise direction of the part 1 are therefore separated. However, it is in accordance with the invention that the slots 19, although being directed toward one another, should not meet, so that the suspension part 1 remains a single part and does not therefore need to be made heavier with connecting bolts or similar elements. The technical role of the slots 19 is to limit the propagation of cracks such as the crack 20, which may appear through fatigue because of the forces that the suspension part 1 has to transmit between the connecting rods 8 and 9 and the fixing elements 11, to progress transversely from one long edge side of the plate 4 to the other, stopping them. When the crack 20 has reached the slot 19, it has then separated a portion of the suspension part 1 from the remainder thereof, and generally isolated one of the fixing elements 11, whose role of supporting the turbojet engine 3 is then reduced, especially if the crack 20 has reached the drilling 14, which is then likely to open up; however, the other three fixing elements 11 continue to belong to one and the same compact bit of the suspension part 1 and to act as before. The dimensions of the suspension part 1 in general and of the yokes 5 in particular are chosen with that in mind, particularly the upper portions 15 of the yokes 5 have enough thickness to continue to withstand the forces of the turbojet engine 3 even if forces can continue to pass through just one of the yokes 5 of the pair. An additional thickness 21 of the top portion 15 is located on the inside of the yokes 5, over the connecting rods 8 or 9, without there being any need to increase the overall width of the suspension part 1. That is why the bottom portion 16 for supporting the connecting rods 8 and 9 is placed under the top portion 15, with the additional advantage that the moment produced by the overhang between the connecting rod 8 or 9 and the fixing element 11 that remains when the other has failed remains modest, thus avoiding introducing excessive bending stresses into the yokes 5.

As can be seen in the exemplary suspension part shown in the figure, each of the slots 19 can end with an opening which is larger than other portions of the slots 19. As also seen from the figure, the slots 19 can define openings which are narrower than the distance between the inner faces of the corresponding lower or bottom portions 16 of the yokes 5. The openings of the slots 19 can also be narrower than the distance between the inner faces of the top or upper portions 15 of the yokes 5.

The slots 19 run past the places in the suspension part 1 where there are stress concentrations and where cracks are likely to originate, that is to say over the yokes 5 and the journals 18, and between the fixing elements 11. The central piece of the suspension part 1 is less highly stressed and can therefore remain free of slots 19, since there is hardly any risk of cracks developing there. It will also be noted that the-ribs 6 are in the shape of arches, low under the center of the plate 4 and tall nearer the yokes 5.

To sum up, it can be seen that the invention allows the suspension part 1 to be kept in service without danger, even in the event of fatigue cracking, without there being any need to increase its bulk, its weight or its complexity.

What is claimed is:

1. A suspension part for mounting a turbojet engine to a fixed structure, said suspension part comprising:

at least two connecting rods; and two ends equipped with two fixing elements, juxtaposed in a widthwise direction of the suspension part, the ends being shaped into pairs of yokes respectively flanking the connecting rods and each comprising one of the fixing elements and a drilling for a journal of a connecting rod, the drilling being situated underneath said fixing element, wherein slots passing through the two ends of the suspension part run between the yokes without running over a central portion of the suspension part, and each of said yokes has an upper portion with an additional thickness located on an inside of each of said yokes.

2. The suspension part as claimed in claim 1, wherein the yokes are thicker at the fixing elements than said yokes are at the drillings for the journal.

3. The suspension part as claimed in claim 1, wherein said additional thickness is located over the connecting rods.

4. The suspension part as claimed in claim 1, wherein each of said slots is narrower than a shortest distance between said yokes.

5. The suspension part as claimed in claim 1, wherein each of said yokes has a bottom portion located under said upper portion and configured to support said connecting rods.

6. The suspension part as claimed in claim 1, wherein each of said slots runs toward said central portion at least as far as the ends of the yokes.

7. The suspension part as claimed in claim 1, wherein each of said slots ends with an opening which is larger than other portions of the slots.

8. The suspension part as claimed in claim 1, further comprising ribs configured to connect corresponding yokes together, said corresponding yokes being positioned at opposite ends of said suspension part.

9. The suspension part as claimed in claim 8, wherein each of said ribs has an arch shape with a thinner portion under said central portion arid a thicker portion toward said yokes.

10. A suspension part for mounting an engine to a fixed structure, said suspension part comprising:

at least two fixation elements positioned at each end of said suspension part;

a pair of yokes at each end of said suspension part, each yoke comprising an upper portion located under one of said fixation element and a lower portion located under said upper portion, wherein a distance between inner faces of the upper portions for two yokes of said pair of yokes at a same end of the suspension part is shorter than a distance between inner faces of corresponding lower portions for said two yokes at said same end; and at least two slots, each slot passing through one of the ends of said suspension part and between two of said yokes without reaching a central portion of the suspension part.

11. The suspension part as claimed in claim 10, further comprising at least two connecting rods, each connecting rod being connected to a pair of said yokes.

12. The suspension part as claimed in claim 11, wherein said connecting rods are configured to be articulated to said engine.

13. The suspension part as claimed in claim 11, wherein said connecting rods are connected to said yokes below said upper portions of said yokes.

14. The suspension part as claimed in claim 13, wherein said connecting rods are connected to said yokes at said lower portions.

15. The suspension part as claimed in claim 14, wherein said slots define openings which are narrower than said distance between said inner faces of said corresponding lower portions.

16. The suspension part as claimed in claim 15, wherein said slots define openings which are narrower than said distance between said inner faces of said upper portions.

17. The suspension part as claimed in claim 14, wherein said upper portions are thicker than said lower portions.

18. The suspension part as claimed in claim 10, wherein each of said slots ends with an opening which is larger than other portions of the slots.

19. The suspension part as claimed in claim 10, further comprising ribs configured to connect corresponding yokes together, said corresponding yokes being positioned at opposite ends of said suspension part.

20. The suspension part as claimed in claim 19, wherein each of said ribs has an arch shape with a thinner portion under said central portion and a thicker portion toward said yokes.

* * * * *